US012779673B2

(12) United States Patent
Adelson et al.

(10) Patent No.: US 12,779,673 B2
(45) Date of Patent: Nov. 3, 2026

(54) SOFT HAND WITH ENDOSKELETON AND HIGH RESOLUTION SENSING

(71) Applicant: Massachusetts Institute of Technology, Cambridge, MA (US)

(72) Inventors: Edward Adelson, Winchester, MA (US); Sandra Liu, Cambridge, MA (US); Leonardo Zamora, Brighton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 182 days.

(21) Appl. No.: 18/604,092

(22) Filed: Mar. 13, 2024

(65) Prior Publication Data

US 2024/0308067 A1 Sep. 19, 2024

Related U.S. Application Data

(60) Provisional application No. 63/452,113, filed on Mar. 14, 2023.

(51) Int. Cl.
*B25J 9/16* (2006.01)
*B25J 13/08* (2006.01)
(Continued)

(52) U.S. Cl.
CPC ........... *B25J 9/1612* (2013.01); *B25J 13/081* (2013.01); *B25J 15/0009* (2013.01); *B25J 15/12* (2013.01)

(58) Field of Classification Search
CPC ...... B25J 9/1612; B25J 9/0015; B25J 13/081; B25J 13/084; B25J 15/0009; B25J 15/12;
(Continued)

(56) References Cited

U.S. PATENT DOCUMENTS 7,420,155 B2 9/2008 Mizota et al.
8,823,639 B2 * 9/2014 Jackson ................ G06F 3/0425
(Continued)

FOREIGN PATENT DOCUMENTS

CN 112088070 A 12/2020
CN 112847355 A 5/2021
(Continued)

OTHER PUBLICATIONS

Machine Translation of KR-20160001933-A (Year: 2016).*
(Continued)

*Primary Examiner* — Ellis B. Ramirez
(74) *Attorney, Agent, or Firm* — Wolf, Greenfield & Sacks, P.C.

(57) ABSTRACT

A robotic finger may include a first endoskeleton segment, a second endoskeleton segment, and a flexure connecting the first endoskeleton segment and the second endoskeleton segment, where the flexure is configured to elastically deform to allow the first endoskeleton segment to move relative to the second endoskeleton segment in a first degree of freedom. The robotic finger may include a transparent elastomeric pad disposed on the first endoskeleton segment and the second endoskeleton segment, at least one light source disposed on at least one of the first endoskeleton segment and the second endoskeleton segment, and at least one photosensitive detector disposed on at least one of the first endoskeleton segment and the second endoskeleton segment.

19 Claims, 5 Drawing Sheets

(51) Int. Cl.
*B25J 15/00* (2006.01)
*B25J 15/12* (2006.01)

(58) Field of Classification Search
CPC ......... B25J 19/021; G05B 2219/37286; G05B 2219/39527
USPC ....... 700/259, 258; 901/10, 30, 28; 348/135; 74/490.05, 490.09
See application file for complete search history.

(56) References Cited

U.S. PATENT DOCUMENTS

| | | | | |
|---|---|---|---|---|
| 11,117,253 | B2 | 9/2021 | Oleynik | |
| 2016/0059412 | A1* | 3/2016 | Oleynik | G05B 19/42 |
| 2017/0049583 | A1* | 2/2017 | Belter | A61F 2/5044 |
| 2017/0252930 | A1* | 9/2017 | Birglen | B25J 9/1065 |
| 2021/0252721 | A1 | 8/2021 | Alspach et al. | |
| 2022/0221357 | A1* | 7/2022 | Elias | G01L 1/24 |
| 2022/0250475 | A1* | 8/2022 | Buth | B60K 35/223 |
| 2022/0287853 | A1 | 9/2022 | Ren | |
| 2023/0072207 | A1* | 3/2023 | Muthusamy | G01L 5/166 |
| 2023/0249368 | A1* | 8/2023 | Padir | B25J 15/08 |
| 2023/0251149 | A1 | 8/2023 | Adelson et al. | |

FOREIGN PATENT DOCUMENTS

| | | | | |
|---|---|---|---|---|
| DE | 102005032502 | B3 | 10/2006 | |
| JP | 2011-230263 | A | 11/2011 | |
| KR | 20160001933 | A * | 1/2016 | A61B 5/6826 |
| WO | WO 2021/076697 | A1 | 4/2021 | |
| WO | WO 2022/132300 | A2 | 6/2022 | |
| WO | WO 2022/191910 | A1 | 9/2022 | |
| WO | WO-2023127302 | A1 * | 7/2023 | B25J 19/023 |

OTHER PUBLICATIONS

Liu et al., GelSight Fin Ray: Incorporating Tactile Sensing into a Soft Compliant Robotic Gripper. 2022 IEEE 5th International Conference on Soft Robotics (RoboSoft). Apr. 2022:925-31. doi: 10.1109/RoboSoft54090.2022.9762175.

Romero et al., Soft, Round, High Resolution Tactile Fingertip Sensors for Dexterous Robotic Manipulation. 2020 IEEE International Conference on Robotics and Automation (ICRA). May 2020: 4796-802. doi: 10.1109/ICRA40945.2020.9196909.

She et al., Exoskeleton-covered soft finger with vision-based proprioception and tactile sensing. 2020 IEEE International Conference on Robotics and Automation. Aug. 2020:10075-81.

Subad et al., Soft Robotic Hands and Tactile Sensors for Underwater Robotics. Appl Mech. Jun. 2021;2(2):356-82. doi: 10.3390/applmech2020021.

Wang et al., GelSight Wedge: Measuring High-Resolution 3D Contact Geometry with a Compact Robot Finger. 2021 IEEE International Conference on Robotics and Automation (ICRA). May 2021:6468-75. doi: 10.1109/ICRA48506.2021.9560783.

Wilson et al., Design of a Fully Actuated Robotic Hand With Multiple Gelsight Tactile Sensors. arXiv. Feb. 2020: 6 pages.

Yuan et al., GelSight: High-Resolution Robot Tactile Sensors for Estimating Geometry and Force. Sensors. Nov. 2017;17(12):2762. doi: 10.3390/s17122762.

* cited by examiner

SOFT HAND WITH ENDOSKELETON AND HIGH RESOLUTION SENSING

RELATED APPLICATIONS

This application claims the benefit of priority under 35 U.S.C. § 119(e) of U.S. Provisional Application Ser. No. 63/452,113, filed Mar. 14, 2023, the disclosure of which is incorporated herein by reference in its entirety.

FIELD

Disclosed embodiments are related to soft robotic end effectors such as hands having and endoskeleton and one or more flexible optical tactile sensors, as well as related methods of use.

BACKGROUND

The sense of touch contributes to the dexterity of human manipulation, especially in cases where high precision is desirable. The complex ensemble of mechanoreceptors in the human hand provides extremely rich tactile sensory signals. These sensory signals encode information such as contact force and contact shape and such signals can be used to detect complex state transitions such as making or breaking contact or the occurrence of slippage between the finger and the grasped object.

Vision based tactile sensors have become employed with robotic systems due to their high signal resolutions and the softness of their sensing surfaces. The softness of the sensing surface allows for larger contact regions as it deforms to conform with the object surface. The resulting contact areas are then characterized in detail via the high-resolution signals. Together, these properties have enabled the use of these sensors in performing multiple tasks such as assessing grasp success, determining a texture of object surfaces, detecting slip and shear force, reconstructing three-dimensional surfaces, and distinguishing between different cloth materials. However, conventional vision based tactile sensors are constrained to flat or nearly flat designs. Additionally, conventional vision based tactile sensors are rigid and do not accommodate flexible manipulators.

SUMMARY

In some aspects, the techniques described herein relate to a robotic finger including: a first endoskeleton segment; a second endoskeleton segment; a flexure connecting the first endoskeleton segment and the second endoskeleton segment, where the flexure is configured to elastically deform to allow the first endoskeleton segment to move relative to the second endoskeleton segment in a first degree of freedom; a transparent elastomeric pad disposed on the first endoskeleton segment and the second endoskeleton segment, where the transparent elastomeric pad has a palmar portion configured to contact an object during use of the robotic finger; at least one light source disposed on at least one of the first endoskeleton segment and the second endoskeleton segment, where the at least one light source is configured to emit light into the transparent elastomeric pad; and at least one photosensitive detector disposed on at least one of the first endoskeleton segment and the second endoskeleton segment, where the at least one photosensitive detector is oriented toward the palmar portion of the transparent elastomeric pad.

In some aspects, the techniques described herein relate to a method of operating a robotic finger, the method including: elastically deforming a flexure connecting a first endoskeleton segment and a second endoskeleton segment, where elastically deforming the flexure moves the first endoskeleton segment relative to the second endoskeleton segment in a first degree of freedom; emitting light from at least one light source disposed on at least one of the first endoskeleton segment and the second endoskeleton segment into a transparent elastomeric pad disposed on the first endoskeleton segment and the second endoskeleton segment, where the transparent elastomeric pad has a palmar portion configured to contact an object during use of the robotic finger; and receiving light at at least one photosensitive detector disposed on least one of the first endoskeleton segment and the second endoskeleton segment, where the at least one photosensitive detector is oriented toward the palmar portion of the transparent elastomeric pad.

In some aspects, the techniques described herein relate to a robotic end effector system, the system including a plurality of robotic fingers. Each robotic finger includes a first endoskeleton segment, a second endoskeleton segment, a flexure connecting the first endoskeleton segment and the second endoskeleton segment, wherein the flexure is configured to elastically deform to allow the first endoskeleton segment to move relative to the second endoskeleton segment in a first degree of freedom, a transparent elastomeric pad disposed on the first endoskeleton segment and the second endoskeleton segment, wherein the transparent elastomeric pad has a palmar portion configured to contact an object during use of the robotic finger, at least one light source disposed on at least one of the first endoskeleton segment and the second endoskeleton segment, wherein the at least one light source is configured to emit light into the transparent elastomeric pad, and at least one photosensitive detector disposed on at least one of the first endoskeleton segment and the second endoskeleton segment, wherein the at least one photosensitive detector is oriented toward the palmar portion of the transparent elastomeric pad. The robotic fingers are configured to grasp an object between the robotic fingers with the transparent elastomeric pad of at least some of the robotic fingers in contact with the object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
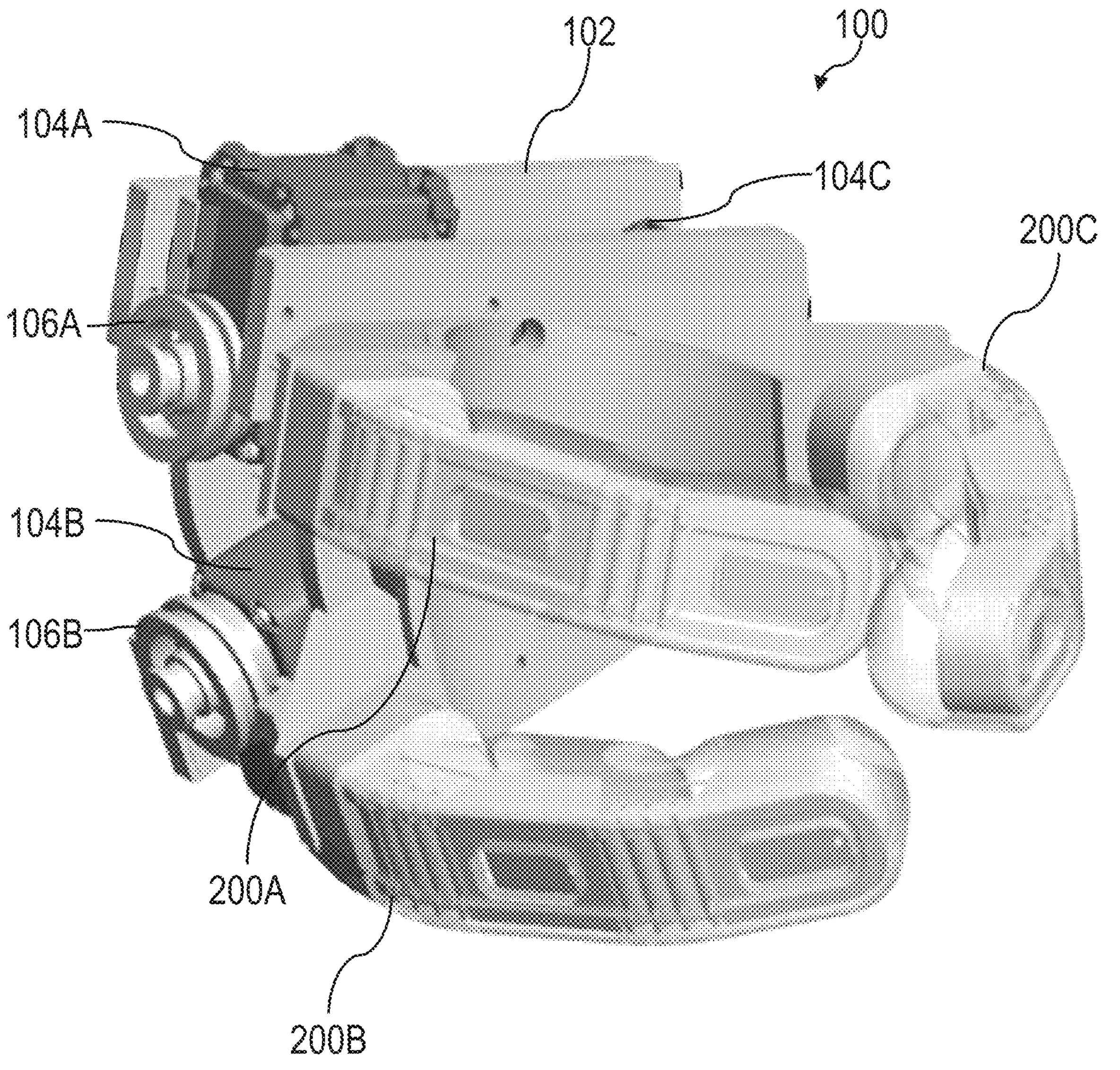
FIG. 1 is a perspective view of an embodiment of an end effector including robotic fingers.

Human hand inspired grippers have been previously designed with varying degrees of sensing, rigidness and anthropomorphism. Although robotic systems were historically composed of rigid materials, interest in soft systems has quickly risen. Rigid hands traditionally focused on control systems and force transmission while neglecting contact rich sensing and compliant gripping that more closely mimics human hands. Rigid robots have often enjoyed well defined kinematic models and high strength, making them ideal manipulators for repeatable and complex motions. However, gripping often introduces a degree of uncertainty that may require a softer touch to avoid high energy collisions. Soft robotic grippers benefit from their natural robustness and compliance which have proven to be critical when grasping. However, due to their compliant nature, soft robots are considered to have infinite degrees of freedom leading to challenges when developing a robust control system.

Many attempts have been made at combining soft and rigid robotics to achieve flexible yet strong robots. One approach to strengthening and increasing precision of soft grippers has been embedding skeletons within their structure. Although the addition of an endoskeleton brings various benefits, it also comes with some drawbacks including increased manufacturing and modeling complexity. Despite the various advances in robotics to achieve a soft human-like hand, there are still critical elements missing from current designs. Most notably, there is an absence of rich geometric-based sensing in rigid and soft hands alike.

Most previous tactile sensing work in robotic grippers has been force-based using capacitive or strain sensors. These sensors provide a low-cost option with high response time, but these types of sensors are better for sensing stiff and flat surfaces. However, the inventors have appreciated that vision-based sensors can provide additional sensing data and be highly compatible with soft robots.

In view of the above, the inventors have appreciated the benefits of an endoskeleton finger design for a human-inspired gripper that incorporates photosensitive detector based tactile sensing along a length of the finger. Embodiments described herein provide continuous high-resolution tactile sensing along a curved surface of the robotic finger. The inventors have further appreciated that prior robotic end effectors employing fingertip sensors are limited in their ability to identify objects with touch-based information. For example, it may be desirable to contact an object at more locations than merely a fingertip. The inventors have particularly appreciated that it may be desirable to obtain touch sensing information at multiple points along an entire length of a robotic finger, rather than merely a fingertip. By employing multiple robotic fingers in an end effector, touch sensing information may be obtained from multiple directions, allowing more accurate characterization of an object based purely on the touch sensitive information.

In some embodiments, a robotic end effector system may include a plurality of robotic fingers. In some embodiments, each of the robotic fingers may include a transparent elastomeric pad disposed on an endoskeleton. In some embodiments, the transparent elastomeric pad may extend over a length of the robotic finger. In some embodiments, the transparent elastomeric pad may at least partially surround the endoskeleton. In some embodiments, the plurality of robotic fingers may be configured to grasp an object between the robotic fingers with each transparent elastomeric pad of the robotic fingers in contact with the object. The robotic fingers may be oriented in different directions, such that each robotic fingers engages a different portion of the object from a different direction. In some embodiments, the robotic end effector system may include three robotic fingers, with one robotic finger opposing two other robotic fingers. Each robotic finger of the robotic end effector system may include a photosensitive detector (e.g., a camera) configured to obtain touch information based on deformation of the transparent elastomeric pads when in contact with an object, as will be discussed further below. In some embodiments, the transparent elastomeric pad may include an at least partially reflective layer disposed on a palmar surface of the elastomeric pad that is configured to reflect light into a photosensitive detector. Accordingly, touch information may be obtained from each robotic finger via the photosensitive detector(s) of each robotic finger, which may in turn be employed to characterize the grasped object.

According to exemplary embodiments herein, a robotic finger may include a dorsal side and a palmar side. As used herein, “palmar” may refer to a direction facing an object grasped by the robotic finger. In some embodiments, a palmar side of a robotic finger may be configured to interface with an object. A palmar portion of a robotic finger may be a portion closest to an object to be grasped. As used herein, “dorsal” may refer to a direction facing away from an object grasped by the robotic finger. In some embodiments, the dorsal side of the robotic finger faces an opposite direction compared to the palmar side. A dorsal portion of a robotic finger may be a portion furthest from an object to be grasped.

In addition to the above, the inventors have appreciated the benefits of a robotic finger employing retrographic sensing with an endoskeleton. Conventional robotic fingers employing an endoskeleton are clunky and increase the size of a robotic finger. The inventors have appreciated the benefits of employing retrographic sensing along at least a portion of the length of a robotic finger while maintaining a compact design. Additionally, the inventors have appreciated the benefits of a robotic finger where an entirety or majority of an external palmar surface is soft. Finally, the inventors have appreciated the benefits of a soft robotic finger having a single degree of freedom that resists motion in other degrees of freedom.

In some embodiments, a robotic finger includes a first endoskeleton segment, a second endoskeleton segment, and a flexure connecting the first endoskeleton segment and the second endoskeleton segment. The first and second endoskeleton segments may be substantially rigid, such that they resist bending. The flexure may be configured to elastically deform to allow the first and second endoskeleton segments to rotate relative to one another in a first degree of freedom. In some embodiments, the flexure may allow the first and second endoskeleton segments to move in a first degree of freedom while resisting motions other than those in the first degree of freedom. For example, the flexure may resist movement of the first and second endoskeleton segments in directions perpendicular to the first degree of freedom. In some embodiments, the flexure may include a corrugated structure configured to allow elastic bending in the first degree of freedom while resisting bending in other directions. In some such embodiments, one or more folds of the corrugated structure may extend parallel to a bending axis about which the finger bends (e.g., perpendicular to a longitudinal axis of the finger). Together, the first and second endoskeleton segments and the flexure may compose at least a portion of the endoskeleton of the robotic finger. The robotic finger may also include a transparent elastomeric pad disposed on the first and second endoskeleton segments. In some embodiments, the elastomeric pad may span at least a portion, and in some instances an entire, longitudinal length of the endoskeleton. The elastomeric pad may at least partially surround the flexure and first and second endoskeleton segments such that the endoskeleton is disposed inside of the elastomeric pad. The elastomeric pad may be configured to contact and grasp an object when the robotic finger is actuated and the first and second endoskeletons are moved in the first degree of freedom. In some embodiments, the transparent elastomeric pad may have a palmar portion configured to contact an object during use of the robotic finger. In some embodiments, an endoskeleton may be disposed on a dorsal portion of the elastomeric pad, and in some embodiments, may be entirely disposed in a dorsal half of the elastomeric pad (e.g., disposed on a dorsal side of a longitudinal centerline).

In some embodiments, a robotic finger includes at least one cable connected to the first endoskeleton segment and the second endoskeleton segment configured to move the first endoskeleton segment relative to the second endoskeleton segment. In particular, application of tension to the at least one cable may be used to bend the robotic finger in the first degree of freedom. In some embodiments, a robotic finger may include at least a dorsal cable and a palmar cable. Application of tension to the dorsal cable may cause the robotic finger to straighten (e.g., the first endoskeleton segment moves relative to the second endoskeleton segment in a first direction) and application of tension to the palmar cable may cause the robotic finger to bend (e.g., the first endoskeleton segment moves relative to the second endoskeleton segment in a second direction opposite the first direction). In such an embodiment, the dorsal cable may be disposed on a dorsal side of the first and second endoskeleton segments and may run parallel to a longitudinal axis of the robotic finger. The palmar cable may be disposed on a palmar side of the first and second endoskeleton segments and may also run parallel to a longitudinal axis of the robotic finger. Of course, while a particular structure and method for articulating the robotic finger is disclosed, it should be understood that any appropriate method for articulating a robotic finger may be used as the disclosure is not so limited.

In some embodiments, a robotic finger may include at least one light source disposed on at least one of the first endoskeleton segment and the second endoskeleton segment. The light source may be configured to emit light into the transparent elastomeric pad. The at least one light source may emit any suitable wavelength of light that illuminates the elastomeric pad. In some embodiments, the at least one light source is configured to emit light in a visual wavelength (e.g., between 380 and 700 nm). In some embodiments, light of three different wavelengths, may be emitted by a plurality of light sources into the transparent elastomeric pad in different directions and/or from different locations on an endoskeleton. For example, a first wavelength of light emitted into the transparent elastomeric pad may be between 635 nm and 700 nm (corresponding to the color red), a second wavelength of light emitted into the transparent elastomeric pad may be between 560 nm and 520 nm (corresponding to the color green), and a third wavelength of light emitted into the transparent elastomeric pad may be between 490 and 450 nm (corresponding to the color blue). In some embodiments, wavelength bands of light sources may be substantially non-overlapping. Of course, one or more light sources may emit any suitable wavelength band (s) of light into an elastomeric pad of a robotic finger at any suitable angle, as the present disclosure is not so limited. For example, in some embodiments, one or more light sources may emit electromagnetic radiation in any appropriate range of wavelengths, including ultraviolet, near-infrared, infrared, etc. Correspondingly, a photosensitive detector of a retrographic sensor may be configured to receive and detect electromagnetic radiation emitted from the one or more light sources, where that electromagnetic radiation has any appropriate range of wavelengths. Accordingly, while exemplary embodiments described herein employ visual light in a range of 380 nm to 700 nm, any suitable wavelength of electromagnetic radiation may be employed, as the present disclosure is not so limited.

As used herein, two wavelength bands may be substantially non-overlapping when light emitted by a first source (e.g., a first light source) and a second source (e.g., a second light source) are primarily emitted at different wavelengths. For example, a majority of the light emitted by the first source may be in a wavelength band that is different from the wavelength band where a majority of the light is emitted by the second source. However, due to excitation light sources and fluorescent light emissions typically being emitted over a broad range of wavelengths with different intensities, there may be some amount of light emissions at wavelengths associated with another wavelength band. However, emissions from a light source outside of the associated wavelength bands may have intensities that are significantly less than an intensity of light emitted at wavelengths within the wavelength band of that source. For example, intensities of light emitted from a source at wavelengths outside of a wavelength band may be 5% or less than a peak intensity of wavelengths emitted from the source within the wavelength band.

In some embodiments, a robotic finger may include at least one photosensitive detector disposed on an endoskeleton of the robotic finger and oriented toward an elastomeric pad. In some embodiments, the at least one photosensitive detector may be directly disposed on the endoskeleton of the robotic finger. In other embodiments, the at least one photosensitive detector may be indirectly disposed on the endoskeleton (e.g., one or more components or structures may be positioned between the endoskeleton and at least one photosensitive detector), as the present disclosure is not so limited. The photosensitive detector(s) may be oriented toward an interior surface of the elastomeric pad and be configured to image the elastomeric pad. Light reflected off an at least partially reflective layer disposed on the elastomeric pad may be received by the photosensitive detector and included in the image. As discussed further below, the image may be processed to obtain information regarding the deformation of the elastomeric pad. In some embodiments, a robotic finger may include any number of photosensitive detectors per endoskeleton segment. For example, each endoskeleton segment may include a photosensitive detector. In some embodiments, a robotic finger may include two photosensitive detectors. In some embodiments a photosensitive detector may be a camera such as an RGB camera, though other detectors are also contemplated. In some embodiments, to obtain sensing information over an entire length of a robotic finger, multiple photosensitive detectors may have overlapping fields of view. In some embodiments, a field of view of a photosensitive detector may be between 120 and 170 degrees. In some embodiments, photosensitive detectors may be disposed inside of a transparent elastomeric pad and may be oriented toward a palmar side of the elastomeric pad. In some such embodiments, the photosensitive detectors may be disposed on a dorsal side of the elastomeric pad, such that the detectors are spaced from a palmar surface of the elastomeric pad. In some embodiments, photosensitive detectors of a robotic finger may be disposed on a dorsal side of a longitudinal centerline of the robotic finger.

In some cases, it may be desirable to increase the perceptibility of deformations of an elastomeric pad employed with an at least partially reflective layer as perceived by a photosensitive detector. In some embodiments, a photosensitive detector (e.g., an imaging device, camera, etc.) may include one or more color channels configured to perceive different wavelengths of light, like other embodiments discussed previously. To utilize these separate channels in some photosensitive detectors, in some embodiments a retrographic sensor may employ at least two different light sources emitting at least two different wavelengths of light disposed at different angles relative to one another. While exemplary embodiments described herein refer to singular wavelengths, it should be appreciated that in other embodiments singular wavelengths (e.g., dominant wavelengths) may correspond to a band of wavelengths, as the present disclosure is not so limited. For example, light of a first wavelength may be emitted into the transparent elastomeric pad in a first direction using a first light source positioned at a first location on an endoskeleton, while light of a second wavelength is emitted into the transparent elastomeric pad in a second direction different from the first direction using a second light source positioned at a second location on an endoskeleton. The at least two different wavelengths of light maybe perceived by a photosensitive detector configured to perceive the first wavelength and second wavelength of light on separate channels. Such an arrangement may allow for more precision in characterizing a surface or object in contact with an at least partially reflective layer disposed on an elastomeric pad. For example, the different wavelengths of light may enable photometric stereo processing.

According to exemplary embodiments herein, one or more photosensitive detectors of a robotic finger may pass a signal corresponding to an image of the elastomeric pad to a processor for processing. The processor may be configured to execute computer readable instructions stored in volatile or non-volatile memory. In some instances, and as described further below, the processor may use the signal to determine information about an object or surface in contact with the robotic finger which may then be used for controlling a robotic system, such as a robotic gripper, associated with the robotic finger. In some embodiments, a photosensitive detector may not be physically oriented toward an elastomeric pad but may instead be visually oriented toward the transparent elastomeric pad via one or more mirrors. In this manner, a photosensitive detectors may be physically oriented in any suitable orientation, as the present disclosure is not so limited.

According to exemplary embodiments herein, when an object or surface contacts the at least partially reflective layer disposed on a transparent elastomeric pad of a robotic finger, the elastomeric pad may deform, thereby changing a reflective angle of the light in that area in a manner that may be detected by a photosensitive detector. Accordingly, the characteristics of the object or surface may be determined by the change in the light in the assembly as observed by the photosensitive detector. The photosensitive detector may be positioned to view the elastomeric pad. That is, the photosensitive detector may be physically and/or visually oriented toward an internal surface of the elastomeric pad.

In some embodiments, an at least partially reflective layer used with the embodiments of robotic fingers described herein may be a semi-specular material with respect to light supplied by one or more light sources (e.g., visual light in a wavelength between 380 to 700 nm). In some embodiments, an at least partially reflective layer such as a semi-specular layer may have a reflectance under light from the one or more light sources greater than or equal to 50%, 60%, 75%, 80%, 90% and/or any other suitable percentage. Correspondingly, the at least partially reflective layer may have a reflectance under light from the one or more light sources less than or equal to 100%, 95%, 90%, 75%, 60%, and/or any other suitable percentage. Combinations of these values are contemplated, including an at least partially reflective layer having a reflectance under light from the one or more light sources between 50% and 95%, between 60% and 80%, or between 75% and 100%. Of course, an at least partially reflective layer such as a semi-specular material may have any suitable reflectance under light from the one or more light sources, including a reflectance different from those noted above, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of an embodiment of an end effector 100 including robotic fingers 200A, 200B, and 200C. In the embodiment of FIG. 1, the end effector includes three robotic fingers: a first robotic finger 200A, a second robotic finger 200B, and a third robotic finger 200C. The end effector 100 includes a chassis 102 configured to support the robotic fingers. In some embodiments, temporary fasteners on the chassis may allow for fast replacement of damaged fingers or for future iterations. The robotic fingers are positioned in a 'Y' pattern with two fingers (e.g., first and second fingers 200A, 200B) and an opposing thumb (third finger 200C). The first finger 200A and the second finger 200B are spaced thirty degrees apart to distribute grasping force without creating collisions. The end effector 100 may include a palm 108. The palm may have a rounded feature with a polyurethane foam layer or other appropriate polymeric foam layer to increase grasping ability. The chassis 102 may be configured to be fastened to a robotic arm. Three actuators 104A, 104B, 104C (e.g., servos) are mounted on the chassis 102 are configured to actuator the robotic fingers through double axle spools 106A, 106B, 106C. The double axle design allows for actuated contraction and extension of each finger via application of tension to cables disposed in each finger. In some embodiments, the various components of the end effector may be 3D printed. In some embodiments, the various components of the end effector may be formed using any suitable conventional process, such as injection molding, machining, or casting. In some embodiments, some components of the end effector may be formed via one process, while other components are formed by another process. In the embodiment of FIG. 1, each of the robotic fingers is identical. However, it is contemplated that the robotic fingers may vary in size, shape, orientation, or any other property to improve functionality. For instance, it may be desirable vary lengths of the different robotic fingers to improve gripping position or strength.

It is contemplated that an end effector may have any suitable configuration which allows for gripping of objects. For instance, while the embodiment of FIG. 1 includes an end effector with three robotic fingers, it is contemplated that that an end effector may have any number of robotic fingers in any suitable configuration. For instance, an end effector may include four or five robotic fingers arranged to mimic a human hand. In other embodiments, the end effector may include multiple thumbs opposing multiple fingers. Robotic fingers on the same side (i.e. not opposing) may be spaced at any angle which allows for distribution of grasping forces while avoiding collisions.

Figure 2:
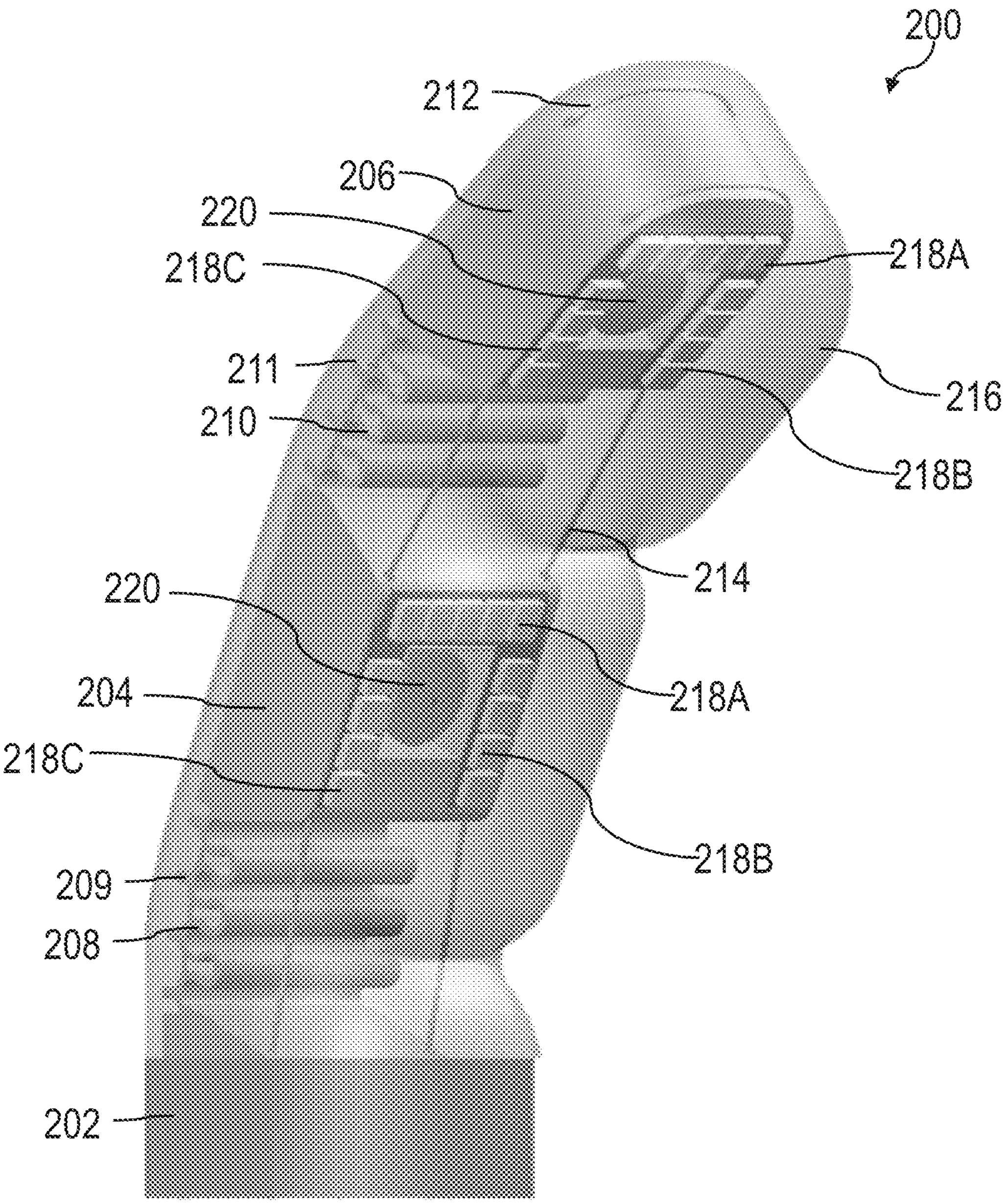
FIG. 2 is a perspective view of an embodiment of a robotic finger.

FIG. 2 is a perspective view of an embodiment of a robotic finger 200. The robotic finger 200 is composed of an endoskeleton encased in an elastomeric pad 216 with two embedded photosensitive detectors 220 for continuous sensing. The endoskeleton is configured as one continuous piece with a first endoskeleton segment 204 and a second endoskeleton segment 206 connected to a first flexure 208 and a second flexure 210. The flexures form joints and are configured elastically deform to allow the first and second segments to move relative to one another in a degree of freedom. As shown in FIG. 2, the robotic finger includes a base 202, which is connected to the first segment 204 by the first flexure 208. The first segment 204 is connected to the second segment 206 by the second flexure 210. This design minimizes the number of parts required to fabricate a robotic finger when compared to conventional rigid fingers. The flexure design may provide high compliance and low deformation of individual elements to reduce elastomeric pad delamination. In some embodiments, the endoskeleton may be manufactured using any appropriate manufacturing process, such as 3D-printing (e.g. fused filament, SLA, etc.), injection molding, or any other appropriate manufacturing process. In some embodiments, the endoskeleton may be 3D printed, or otherwise manufacturing, using any appropriate polymer which may exhibit an appropriate combination of high strength and relatively low tensile modulus in some embodiments. This combination of properties allowed minimal force loss during actuation. As shown in FIG. 2, the first and second endoskeleton segments 204, 206 may be substantially rigid, such that they resist bending. The flexures 208, 210 may be configured to elastically deform to allow the first and second endoskeleton segments to move in a first degree of freedom while resisting motions other than those in the first degree of freedom. For example, the flexures may resist movement of the first and second endoskeleton segments in directions perpendicular to the first degree of freedom. In some embodiments as shown in FIG. 2, the flexure may include a corrugated structure configured to allow elastic bending in the first degree of freedom while resisting bending in other directions. In some such embodiments, one or more folds of the corrugated structure may extend parallel to a bending axis about which the finger bends (e.g., perpendicular to a longitudinal axis of the finger). In the embodiment of FIG. 2, the flexures include three folds forming the corrugated structure. However, it is contemplated that any suitable number of folds may for the corrugated structure. While the above embodiments disclose a robotic finger with two endoskeleton segments and two flexures, it is contemplated that any number of endoskeleton segments or any number of flexures may be used. For example, a robotic finger may include three or four endoskeleton segments and 3 or four flexures.

As shown in FIG. 2, the robotic finger includes a transparent elastomeric pad 216 disposed on the first and second endoskeleton segments. In some embodiments, the elastomeric pad may be formed of silicone. In some embodiments, the elastomeric pad 216 may span a longitudinal length of the endoskeleton, from a distal end of the robotic finger to the base 202. In some embodiments, the elastomeric pad may extend only a portion of the longitudinal length from the distal end of the robotic finger to the base. The elastomeric pad at least partially surrounds the flexures 208, 210 and first and second endoskeleton segments 204, 206 such that the endoskeleton is disposed inside of the elastomeric pad. The elastomeric pad may be configured to contact and grasp and object when the robotic finger is actuated and the first and second endoskeletons are moved in the first degree of freedom. In some embodiments, the transparent elastomeric pad may have a palmar portion configured to contact an object during use of the robotic finger. As shown in FIG. 2, an endoskeleton may be disposed on a dorsal portion of the elastomeric pad, and in some embodiments, may be entirely disposed in a dorsal half of the elastomeric pad (e.g., disposed on a dorsal side of a longitudinal centerline). Such an arrangement may provide sufficient space for the photosensitive detectors 220 to image the transparent elastomeric pad 216. In some embodiments, the transparent elastomeric pad may include an at least partially reflective layer disposed on its palmar surface that is configured to reflect light internal to the elastomeric pad such that an interior surface of the at least partially reflect layer may be imaged by the photosensitive detectors 220.

As shown in FIG. 2, each endoskeleton segment includes an integrated photosensitive detector 220 (e.g., camera) to prevent any shifting during actuation of the robotic finger. Light sources are mounted to the endoskeleton segments that are configured to emit light into the elastomeric pad 216. Three sets of red LEDs 218A, green LEDs 218B, and blue LEDs 218C were mounted with adhesive onto the rigid segment of the endoskeleton. The light sources emitting different wavelength bands are spaced 90 degrees apart to create a colored light gradient.

While the above embodiments disclose a single integrated photosensitive detector integrated into each endoskeleton segments, it is contemplated that that any number of photosensitive detectors may be included per endoskeleton segment. In some embodiments, different endoskeleton segments contain different numbers of integrated photosensitive detectors. For instance, first endoskeleton segment may contain one integrated photosensitive detector, while second endoskeleton segment may contain two or three photo sensitive detectors. In some embodiments, at least one of the endoskeleton segments may contain no integrated photosensitive detectors.

As shown in FIG. 2, the robotic finger employs cable-driven actuation to reduce potential camera-view obstructions and also so that the camera may be more easily integrated into the endoskeleton structure. In particular, the robotic finger includes dorsal cables 212 and palmar cables 214. The dorsal cables are attached to the endoskeleton segments and the flexures at flexure guides 209, 211. The palmar cables are attached to the endoskeleton segments only. In some embodiments, the palmar cables are attached to the endoskeleton segments and to the flexures. Application of tension to the dorsal cables is configured to extend the robotic finger, and application of tension to the palmar cables is configured to bend the robotic finger in the first degree of freedom.

The robotic finger may contain any suitable number of dorsal and palmar cables. In some embodiments, the robotic finger may contain more dorsal cables than palmar cables, or vice versa. In some embodiments, dorsal and palmar cables are constructed from the same material and have the same thickness. In some embodiments, dorsal cables may be constructed from a different material and/or different thickness as compared to palmar cables.

In some embodiments, the flexures may bend to allow the endoskeleton segments to rotate up to approximately 90° with respect to adjacent endoskeleton segments. In some embodiments, the elastomeric pad may restrict the endoskeleton segments from rotating the full 90° with respect to adjacent endoskeleton segments. In some embodiments, the elastomeric pad may restrict the endoskeleton segments from rotating more than approximately 60° with respect to adjacent endoskeleton segments.

In some embodiments, the transparent elastomeric pad may be molded around the endoskeleton. For example, in some embodiments a two-part mold is employed for casting silicone to create the optically clear medium for the robotic finger. The mold may be designed to hold the endoskeleton during the casting process which removed the need for fasteners or adhesives to hold the silicone layer. The mold may have high curvature to create a rounded finger much like a human finger. Such a curvature may allow for high reflection of light within the silicon, which may improve sensing by removing shadows of pressed objects. The mold design removes any air gap between the camera lens and cast silicone to minimize the refraction of light. To achieve better optical clarity, the mold may be incrementally sanded with sandpaper. In some embodiments, the sandpaper may reach 2000 grit.

Figure 3:
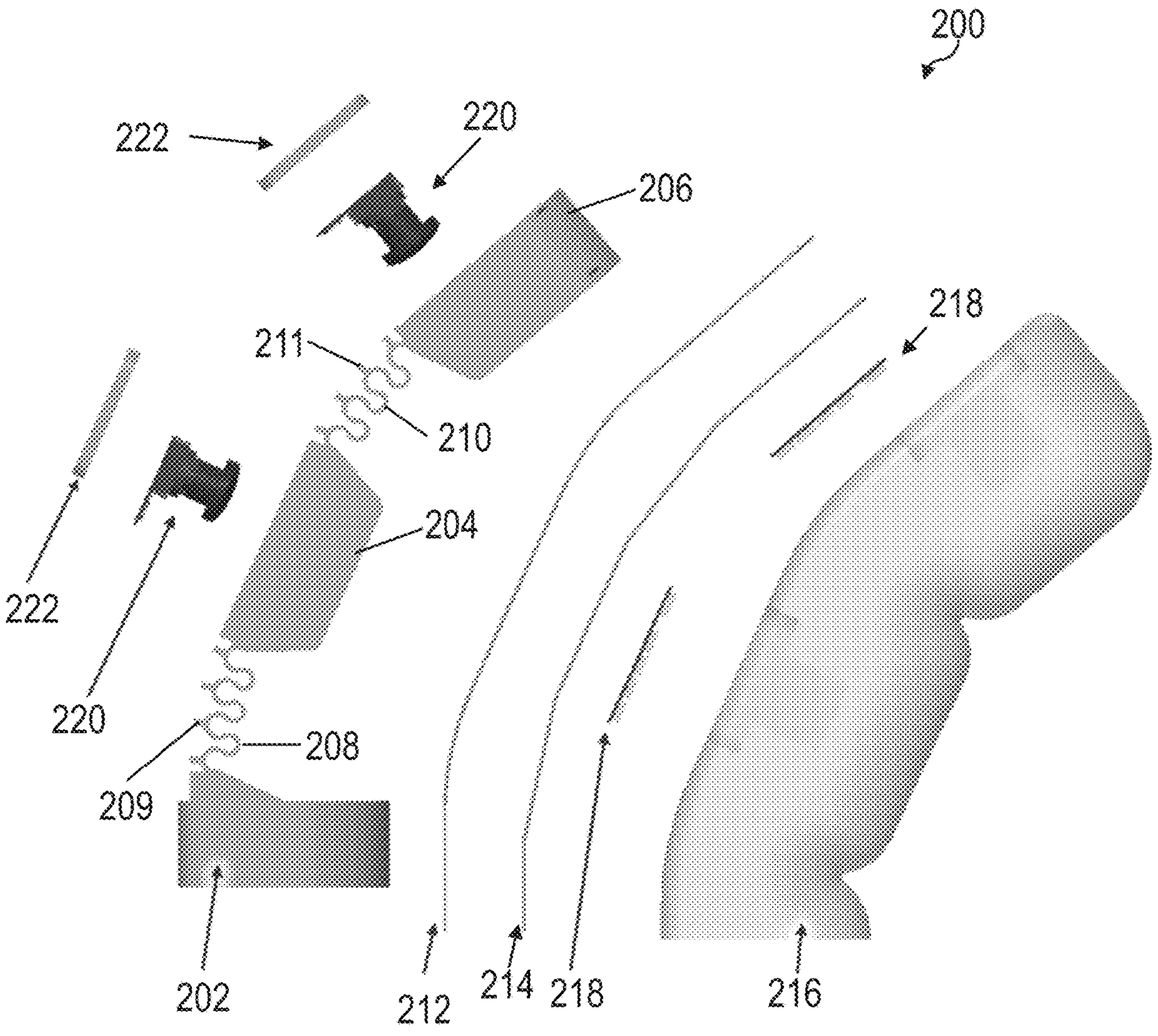
FIG. 3 is an exploded view of an embodiment of a robotic finger.

FIG. 3 is an exploded view of an embodiment of a robotic finger. As shown in FIG. 3, the robotic finger includes an endoskeleton formed of a base 202, a first flexure 208, a first endoskeleton segment 204, a second flexure 210, and a second endoskeleton segment 206. An elastomeric pad 216 is configured to be disposed on the first and second endoskeleton segments. In the particular embodiment of FIG. 3, the endoskeleton is configured to be at least partially disposed in the elastomeric pad. As shown in FIG. 3, the robotic finger includes dorsal cables 212 and a palmar cables 214 configured to actuate the robotic finger. Light sources 218 are disposed on each endoskeleton segment. Likewise, a photosensitive detector 220 is disposed on each endoskeleton segment. In some embodiments, the photosensitive detectors may have overlapping field of view, such that an entire length of the elastomeric pad may be imaged. The photosensitive detectors may be secured in the endoskeleton segments with a plate 222.

Figure 4:
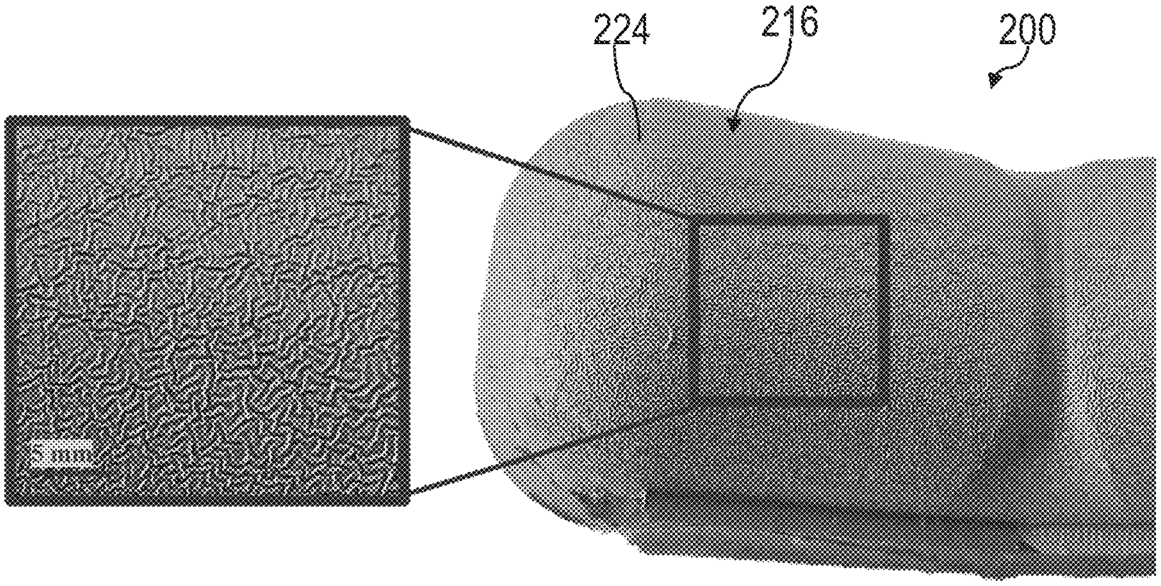
FIG. 4 is an enlarged view of an embodiment of an at least partially reflective layer of a robotic finger.

FIG. 4 is an enlarged view of an embodiment of an at least partially reflective layer 224 of a robotic finger 200. Specifically, FIG. 4 depicts an exterior view of a robotic finger 200. As discussed previously, an at least partially reflective layer may be disposed on an exterior palmar surface of an elastomeric pad, such that light internal to the elastomeric pad may be reflected to be imaged by a photosensitive detector. The inventors have appreciated the benefits of a wrinkled palmar layer, as the wrinkles provide more consistent gripping and release force when using the robotic finger as compared to a smooth palmar layer. Specifically, the wrinkles improve gripping by increasing friction without increasing stiction. In some embodiments, the wrinkled texture may be provided by plasticizer from gel leaking into the palmar layer during curing (e.g., the layer was applied prior to curing the elastomeric pad). In other embodiments the wrinkles may be formed by molding, as the present disclosure is not so limited.

Figure 5:
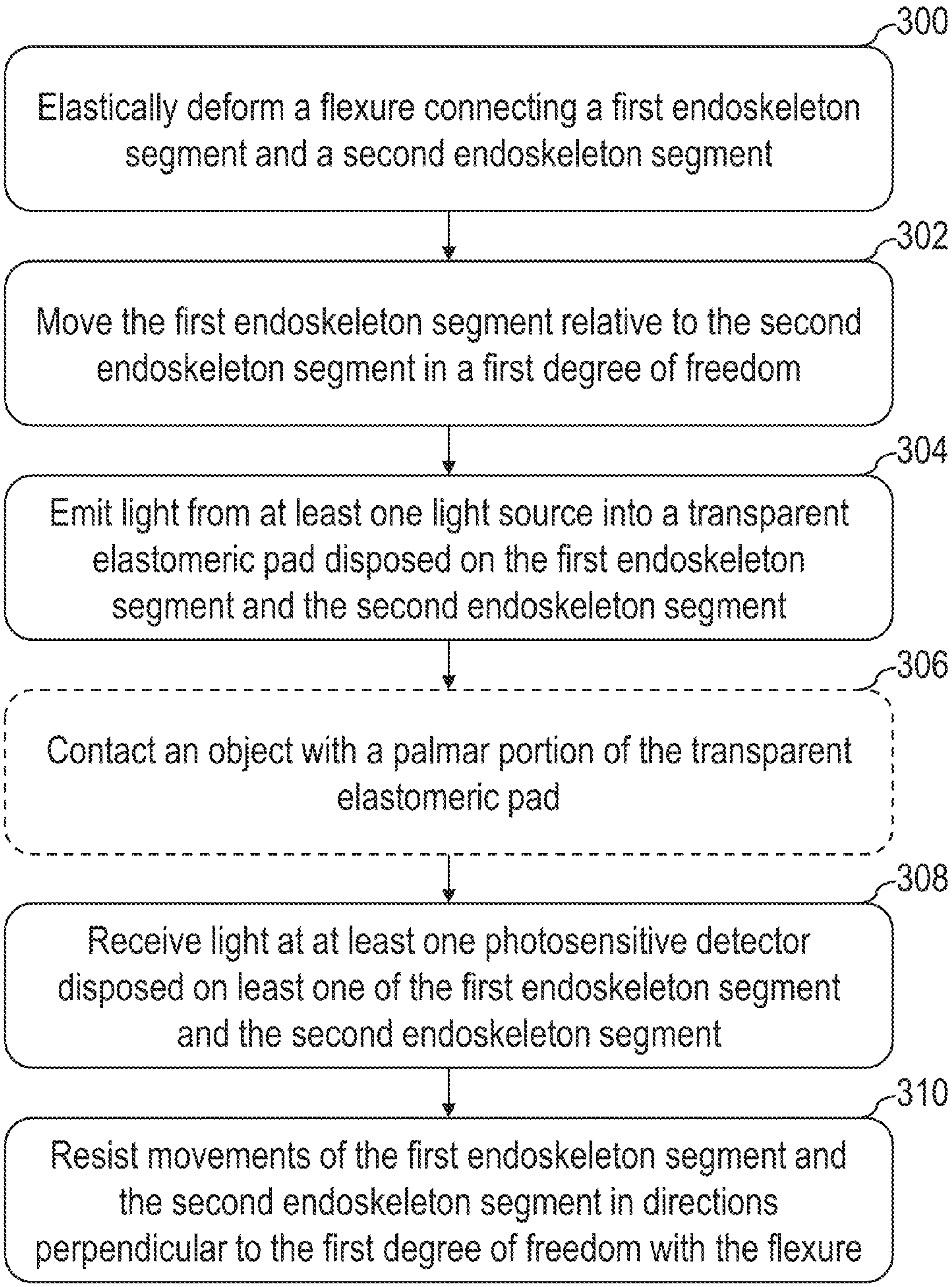
FIG. 5 is a block diagram for a method of operating a robotic finger according to exemplary embodiments herein.

FIG. 5 is a block diagram for a method of operating a robotic finger according to exemplary embodiments herein. In block 300, a flexure is elastically deformed that connects a first endoskeleton segment and a second endoskeleton segment. In block 302, the first endoskeleton segment may be moved relative to the second endoskeleton segment in a first degree of freedom. For example, the robotic finger may bend around a bending axis. In block 304, light is emitted from at least one light source into a transparent elastomeric pad disposed on the first and second endoskeleton segments. Optionally in block 306, an object is contacted with a palmar portion of the transparent elastomeric pad. Contact with the object may cause deformation of the transparent elastomeric pad. In block 308, light is received at at least one photosensitive detection disposed on at least one of the first and second endoskeleton segments. In block 310, movements of the first and second endoskeleton segments are resisted in directions perpendicular to the first degree of freedom with the flexure.

Example: Manufacturing a Robotic Finger

A two-part mold was designed for casting silicone to create the optically clear medium for the robotic finger of exemplary embodiments herein. The mold was designed to hold the endoskeleton during the casting process which removed the need for fasteners or adhesives to hold the silicone layer. The mold had high curvature to create a rounded finger much like a human finger. One benefit of the curved surface was the high reflection of lights within the silicone which aided in sensing by removing shadows of pressed objects. The mold design removed any air gap between the camera lens and cast silicone to minimize the refraction of light. The mold was produced using an SLA printer for its high resolution. To achieve the optical clarity desired, the mold was incrementally sanded with sandpaper reaching 2000 grit.

To allow the silicone to compress when the cables pulled the endoskeleton finger to a closed grasp position, a softer silicone for the robotic finger was synthesized. As a result, a ratio of 1 to 15 to 5 parts of XP-565 parts A and B, and plasticizer (Phenyl Trimethicone) was used. Decreasing the ratio of part A to B for the XP-565 is equivalent to adding less catalyst, which increases the softness of the silicone, while the addition of the plasticizer also causes the resulting cured silicone to have a softer texture.

Before pouring the silicone mixture into the mold, a paint brush was used to paint a thin layer of Inhibit-X. After waiting a few minutes for it to dry, a layer of Ease Release 200 was sprayed on the mold. To create the sensing surface, 2.5 parts 4 μm Aluminum cornflakes were combined with a mixture of 11 parts silicone ink catalyst and gray silicone ink base and 30 parts NOVOCS Gloss and the combination was mixed for a minute using an ultrasonicator. This mixture was then sprayed into the inside of the top mold with an airbrush and left to dry for at least 10 minutes before the endoskeleton was fit inside of the mold and the mold halves were screwed together. Remaining holes and the lips of the mold were covered in a thin layer of brushed-on silicone adhesive, which created a seal for the mold and prevented any silicone leakage outside of the mold that could be caused by mold warping or other printing imperfections.

Once the main body silicone mixture had been degassed, the mixture was slowly poured into the prepared mold. The entire mold assembly was placed on top of a vibrating plate for 10 minutes to remove any bubbles in the camera-viewable areas. These bubbles may have been induced by the silicone pouring over the flexures, electronics, and other 3D printed parts inside of the mold. Some of the bubbles were retained along the side of the sensor surface, which is not viewable by the camera and did not negatively affect the sensor integrity.

Finally, the mold was placed inside of an oven at 125° F. (52° C.) for 12 to 15 hours. This temperature was chosen to prevent any of the electronics or inner structures from reaching their glass temperatures and causing delamination of the parts from the silicone. Once the finger was removed from the mold, the gray sensing membrane surface was no longer smooth and instead had a reticulated wrinkled texture. This phenomena only occurred when the paint was sprayed on the mold first and did not occur if the finger was cured first without the paint in the mold and the paint was sprayed on the finger surface afterwards.

The modular fingers were then placed on the palm plate (e.g., chassis) to create a completed end effector (for example see FIG. 1). The configuration can be changed to enable different types of grasps, although an enveloping grasp may be employed to maximize the amount of sensing the gripper could obtain from grasping an object in its palm.

Example: Sensing Objects with Robotic Finger

Each robotic finger was equipped with two Raspberry Pi Zero spy cameras with a 160-degree field of view, for a total of six cameras of the end effector. All of the cameras were able to view a curved segment of the finger, which was illuminated by tri-directional LEDs. The finger segment images were individually streamed using the mjpg-streamer package and can be processed using OpenCV and fast Poisson solver to get difference images and uncalibrated reconstruction images.

To show the usefulness of having continuous sensing, single grasps of various objects in a grasping object set were collected, and a classification task was performed based on the entire finger sensing region. The grasping object set included three distinct objects from the YCB dataset: the Rubik's cube, one of the toy stacking cups, and the plastic orange. For each object, approximately 500 different grasps were collected using all six of the cameras inside the fingers to obtain a holistic, "full-hand" tactile view of the entire object. To capture many different grasps, each object was reoriented randomly such that it could still be feasibly grasped with the gripper, which allowed different parts of the sensor images to capture different features of the object that was being grabbed. Grasps were also attempted that utilized less than all of the fingers in the cases that the third finger did not have a solid contact with the object in its hand.

For each set of six images captured, the images were stitched together into a 2 by 3 array and used as inputs for a Resnet-50 neural net architecture with the three outputs as the objects used for the grasping data set. Stochastic gradient descent was used as the optimizer, with a learning rate of 1e-3 and a learning rate scheduler with a step size of 7 and a gamma set to 0.1. Data augmentation was also implemented on the entire set of images to deal with potential inconsistent lighting or random noise output of the images, and to account for eventual wear and tear in the silicone over time. The data was split into training and validation sets in an 80% to 20% ratio.

Example: Grasping with Robotic Fingers

The robotic fingers of exemplary embodiments herein and in particular the end effector of FIG. 1 was able to easily and very securely grasp all of the objects in the object set. In particular, the polyethylene foam layer on the palm provided a compliant, deformable surface that the grasped objects could be pressed against. The hand was also able to grasp empty water bottles without crushing them, as well as heavier objects, like a drill with a battery, without dropping them. As expected, the compliance of the soft gel allowed the robotic finger to grasp more fragile objects, while the rigid endoskeleton allowed the fingers to withstand the force and weight of a heavier object.

Each finger was also able to bend to approximately 60 degrees at each flexure point using the actuators shown in FIG. 1. Because the silicone was quite soft and human finger-inspired grooves were added along the flexures, when the fingers bent, the silicone was able to more easily compress around the sides. However, the silicone still obstructed some of the bending angle, and as a result, the endoskeleton finger was unable to bend to its full 90-degree range that it would have been able to otherwise. Furthermore, deepening the grooves to facilitate bending would have limited the sensing area and ultimately interfered with the continuous sensing. Nonetheless, this limitation in motion did not severely limit the hand's ability to grasp objects because the deformable silicone surface over the endoskeleton finger helped to accommodate any loss of motion with its compliance and softness.

Casting the mold while the finger was in a slightly bent position helped to prevent creases in the surface of the silicone when the finger bent. Doing so also prevented silicone creasing when the finger was straightened out since the sensing surface was pulled in tension. Unfortunately, over time, pulling the silicone finger in tension caused parts of the silicone in the base of the finger to slightly tear. This may be mitigated by using a softer silicone with higher elongation.

Finally, given a different arrangement of fingers or with a finger that could behave more thumb-like with an added degree of freedom, these fingers have the potential to grasp an even larger variety of objects.

Example: Tactile Sensing with Robotic Fingers

As designed, the robotic finger was able to continuously sense along the entire length of the finger when it was in a "closed" position. The fingers were also able to sense along the sides as well, although some sensing was slightly lost at the very tips of the fingers.

Overall, the finger was able to provide extremely high-resolution sensing and the raw sensor images were able to capture additional details compared to past sensors due to its rounded shape and the wider camera field of view. However, the wider camera field of view and the curved shape caused some distortion in the sensing image, which is most apparent on the sides of the image frame.

Additionally, some of the sensing surfaces appeared to have distinct rings of lights around the different color channels instead of the blending expected from using a Lambertian paint on the surface of the silicone gel. This phenomena could have been caused by slight delamination of the silicone from the LEDs. The addition of the air interface in the silicone may cause the light to refract from the air to the silicone face and potentially cause these rings of light to form and prevent even blending of the light within the silicone. In particular, when objects were pressed against these sensing surfaces, the light circles began to dissipate. Nonetheless, this did not affect the sensor resolution and the distinct features of the objects were still distinguishable as the tactile sensor had extremely high-resolution.

Finally, the wrinkles, which were manufactured on some of the finger sensing surfaces, were helpful in preventing tears in the silicone membrane. Unlike the smoother sensing surfaces, it seems like the wrinkles helped to mitigate the high stress points caused by sharp corners poking into the sensor surface. The surfaces with wrinkles also had less friction than the smoother surfaces. Although the wrinkled surface made surface reconstruction difficult because the wrinkled texture appeared in difference images, they did not seem to negatively affect object classification. The effect could also have been because if enough pressure was put on the sensor surface, the wrinkles would smooth out slightly, which would not affect object classification results.

Example: Object Classification with Robotic Finger

The object classification model was able to obtain 94.1% accuracy on the validation set. In live testing, which consisted of the end effector of FIG. 1 grasping the 3 objects ten times each, the system was able to correctly classify 80% of the objects. The orange was able to be recognized 9 out of 10 times, while the classifier slightly struggled with distinguishing between the Rubik's cube and the toy cup (80% and 70% accuracy, respectively). Thus, the end effector of FIG. 1 was able to only use a single grasp to recognize the identity of an object.

The orange, which had the most distinguishable tactile features, was the easiest for the model to recognize. Not only was the orange covered in a unique bumpy skin texture, but it also had a distinctive stem portion. On the other hand, unless the fingers directly pressed against a corner of the Rubik's cube or along multiple smaller cubes, it was hard to visually distinguish some of its edges from the edges at the bottom and top of the toy cup. Confusion between the Rubik's cube and the toy cup could be mitigated by adding a palm, which could also provide additional sensing. The added sensing from a larger area on the palm could have helped capture more tactile details that may have been missed by the fingers. Regardless, the object classification using continuous sensing along the multi-fingered hand was fairly robust and able to perform well on the object set. Specifically, the end effector of FIG. 1 may be implemented for grabbing objects in the dark or in an occluded environment where external vision would not be useful or could not be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A robotic finger comprising:

a first endoskeleton segment;

a second endoskeleton segment;

a flexure connecting the first endoskeleton segment and the second endoskeleton segment, wherein the flexure is configured to elastically deform to allow the first endoskeleton segment to move relative to the second endoskeleton segment in a first degree of freedom;

a transparent elastomeric pad disposed on the first endoskeleton segment and the second endoskeleton segment, wherein the transparent elastomeric pad has a palmar portion configured to contact an object during use of the robotic finger;

at least one light source disposed on at least one of the first endoskeleton segment and the second endoskeleton segment, wherein the at least one light source is configured to emit light into the transparent elastomeric pad; and at least one photosensitive detector disposed on at least one of the first endoskeleton segment and the second endoskeleton segment, wherein the at least one photosensitive detector is oriented toward the palmar portion of the transparent elastomeric pad.

2. The robotic finger of claim 1, further comprising at least one cable connected to the first endoskeleton segment, the second endoskeleton segment, and the flexure, wherein the at least one cable is configured to move the first endoskeleton segment relative to the second endoskeleton segment in the first degree of freedom in response to tension applied through the at least one cable.

3. The robotic finger of claim 1, further comprising a base and a second flexure, wherein the second flexure connects the base to the first endoskeleton segment, wherein the second flexure is configured to elastically deform to allow the first endoskeleton segment to move relative to the base in the first degree of freedom.

4. The robotic finger of claim 1, wherein the flexure is configured to resist movements of the first endoskeleton segment and the second endoskeleton segment in directions perpendicular to the first degree of freedom.

5. The robotic finger of claim 1, wherein the flexure comprises a corrugated structure.

6. The robotic finger of claim 1, wherein the transparent elastomeric pad comprises an at least partially reflective layer disposed on a palmar surface of the transparent elastomeric pad, wherein light from the at least one light source is configured to reflect off of the at least partially reflective layer.

7. The robotic finger of claim 6, wherein the at least partially reflective layer comprises a plurality of wrinkles.

8. The robotic finger of claim 1, wherein the at least one light source comprises:

a first plurality of light sources configured to emit a plurality of wavelength bands of light, wherein the first plurality of light sources is disposed on the first endoskeleton segment; and a second plurality of light sources configured to emit plurality of wavelength bands of light, wherein the second plurality of light sources is disposed on the second endoskeleton segment.

9. The robotic finger of claim 1, wherein the at least one photosensitive detector includes a first photosensitive detector disposed on the first endoskeleton segment and a second photosensitive detector disposed on the second endoskeleton segment, wherein the first photosensitive detector and the second photosensitive detector have overlapping fields of view.

10. A method of operating a robotic finger, the method comprising:

elastically deforming a flexure connecting a first endoskeleton segment and a second endoskeleton segment, wherein elastically deforming the flexure moves the first endoskeleton segment relative to the second endoskeleton segment in a first degree of freedom;

emitting light from at least one light source disposed on at least one of the first endoskeleton segment and the second endoskeleton segment into a transparent elastomeric pad disposed on the first endoskeleton segment and the second endoskeleton segment, wherein the transparent elastomeric pad has a palmar portion configured to contact an object during use of the robotic finger; and receiving light at at least one photosensitive detector disposed on least one of the first endoskeleton segment and the second endoskeleton segment, wherein the at least one photosensitive detector is oriented toward the palmar portion of the transparent elastomeric pad.

11. The method of claim 10, wherein the robotic finger comprises at least one cable connected to the first endoskeleton segment, the second endoskeleton segment, and the flexure, wherein the at least one cable is configured to move the first endoskeleton segment relative to the second endoskeleton segment in the first degree of freedom in response to tension applied through the at least one cable.

12. The method of claim 10, wherein the robotic finger comprises a base and a second flexure, wherein the second flexure connects the base to the first endoskeleton segment, wherein the second flexure is configured to elastically deform to allow the first endoskeleton segment to move relative to the base in the first degree of freedom.

13. The method of claim 10, wherein the flexure is configured to resist movements of the first endoskeleton segment and the second endoskeleton segment in directions perpendicular to the first degree of freedom.

14. The method of claim 10, wherein the flexure comprises a corrugated structure.

15. The method of claim 10, wherein the transparent elastomeric pad comprises an at least partially reflective layer disposed on a palmar surface of the transparent elastomeric pad, wherein light from the at least one light source is configured to reflect off of the at least partially reflective layer.

16. The method of claim 15, wherein the at least partially reflective layer comprises a plurality of wrinkles.

17. The method of claim 10, wherein the at least one light source comprises:

a first plurality of light sources configured to emit a plurality of wavelength bands of light, wherein the first plurality of light sources is disposed on the first endoskeleton segment; and a second plurality of light sources configured to emit a plurality of wavelength bands of light, wherein the second plurality of light sources is disposed on the second endoskeleton segment.

18. The method of claim 10, wherein the at least one photosensitive detector includes a first photosensitive detector disposed on the first endoskeleton segment and a second photosensitive detector disposed on the second endoskeleton segment, wherein the first photosensitive detector and the second photosensitive detector have overlapping fields of view.

19. A robotic end effector system comprising:

a plurality of robotic fingers, each robotic finger comprising:

a first endoskeleton segment;

a second endoskeleton segment;

a flexure connecting the first endoskeleton segment and the second endoskeleton segment, wherein the flexure is configured to elastically deform to allow the first endoskeleton segment to move relative to the second endoskeleton segment in a first degree of freedom;

a transparent elastomeric pad disposed on the first endoskeleton segment and the second endoskeleton segment, wherein the transparent elastomeric pad has a palmar portion configured to contact an object during use of the robotic finger;

at least one light source disposed on at least one of the first endoskeleton segment and the second endoskeleton segment, wherein the at least one light source is configured to emit light into the transparent elastomeric pad; and at least one photosensitive detector disposed on at least one of the first endoskeleton segment and the second endoskeleton segment, wherein the at least one photosensitive detector is oriented toward the palmar portion of the transparent elastomeric pad;

wherein the plurality of robotic fingers are configured to grasp an object between the plurality of robotic fingers with the transparent elastomeric pad of at least some of the plurality of robotic fingers in contact with the object.

* * * * *